Dec. 4, 1973  T. J. MONAHAN ET AL  3,776,804
INTERMITTENT DRIVE MECHANISM
Filed June 10, 1971  4 Sheets-Sheet 1

INVENTORS
THOMAS J. MONAHAN
RICHARD C. ADAMS
BY
Orrin M. Haugen
ATTORNEY

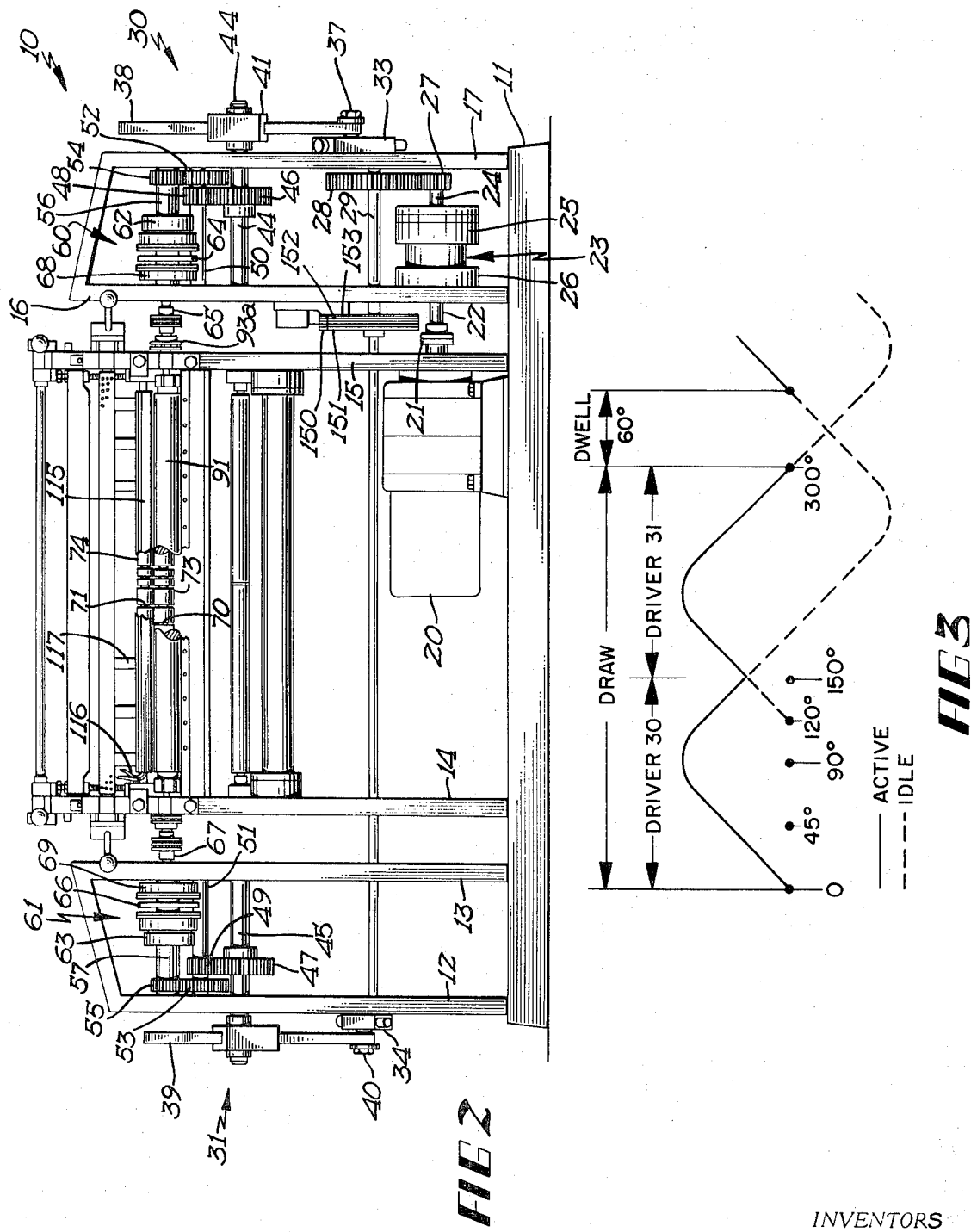

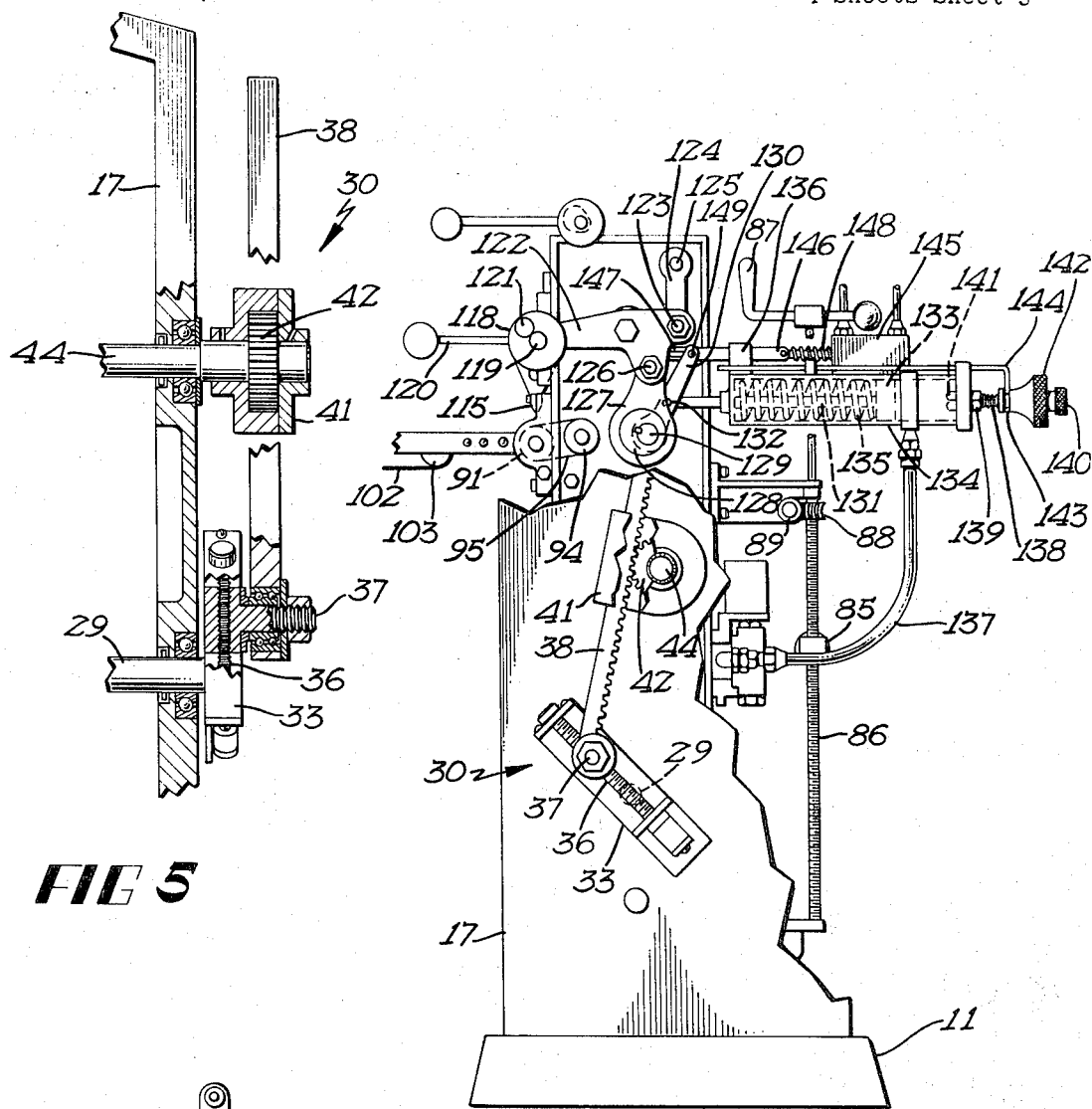
FIG 5
FIG 6
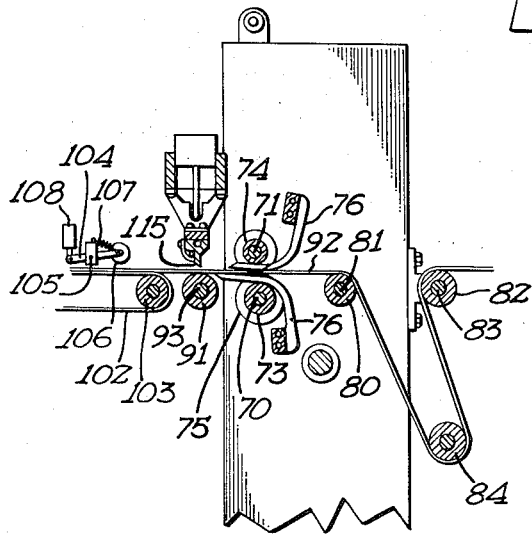
FIG 7
INVENTORS
THOMAS J. MONAHAN
RICHARD C. ADAMS
BY
Orrin M. Haugen
ATTORNEY

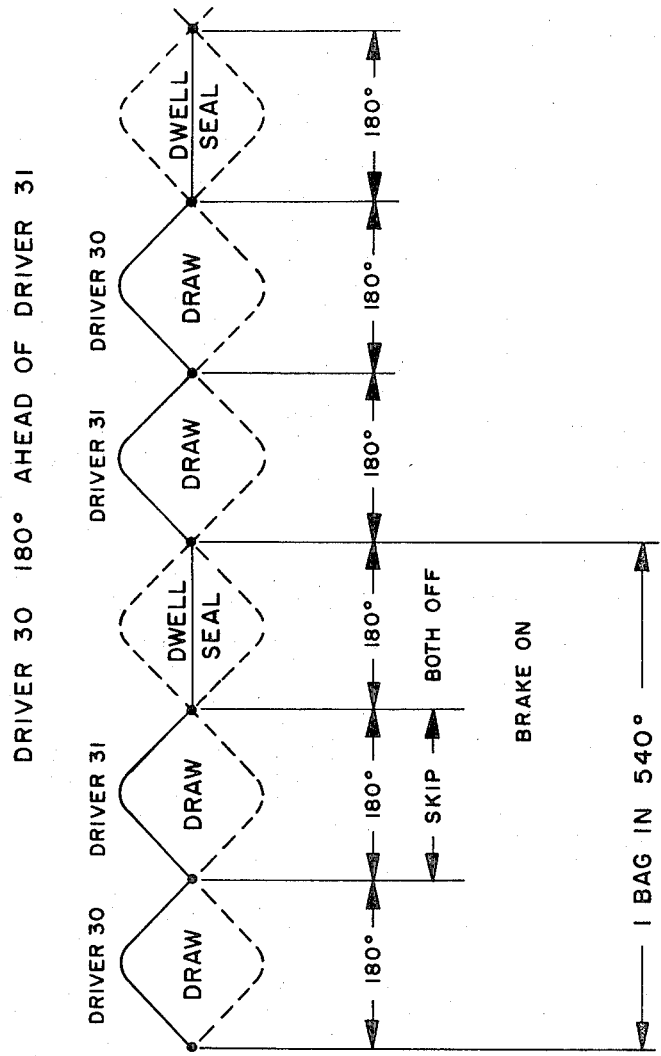

United States Patent Office
3,776,804
Patented Dec. 4, 1973

3,776,804
INTERMITTENT DRIVE MECHANISM
Thomas J. Monahan, Swansea, Mass., and Richard C. Adams, West Barrington, R.I., assignors to G. T. Schjeldahl Company, Northfield, Minn.
Continuation-in-part of abandoned application Ser. No. 81,369, Oct. 16, 1970. This application June 10, 1971, Ser. No. 151,842
Int. Cl. B30b *15/34;* B32b *31/00*
U.S. Cl. 156—515     4 Claims

ABSTRACT OF THE DISCLOSURE

Means for intermittently advancing a web of flexible film comprising drive means for imparting repeating cycles of intermittent motion and dwell to a web of flexible film with the web motion normally being in only the forward direction. The drive means includes an output shaft having first and second input driver means coupled to the output shaft, with the driver means being arranged in phased relationship, one to another, so as to achieve motion in the output shaft for more than 180° of motion in the input shaft. In one operational mode, the driver means are arranged in overlapped phased relationship, one to another, so as to achieve motion from each driver means for less than 180° of motion in the input shaft. In a second operational mode, the driver means are arranged in phased relationship, 180° from each other, so as to achieve motion in the output shaft of 360° during each operational cycle, this 360° of motion being followed by a dwell cycle of 180° of motion, prior to initiating the advance of the web on the next succeeding cycle. In the first operational mode, means are provided for intermittently inter-coupling the first driver means to the input and output shafts for initiating rotation of the output shaft, and for continuing the rotation for a predetermined period of less than one-half cycle of rotation of the input shaft. Thereafter, de-coupling of the first driver means occurs, along with substantially simultaneous inter-coupling occurring between the second driver means and the input and output shafts for the continued rotation of the output shaft for a second pre-determined period of less than one-half cycle of rotation of the input shaft, at which point, de-coupling the second driver means occurs.

CROSS-REFERENCE TO RELATED APPLICATION

The present invention is a continuation-in-part of our copending application Ser. No. 81,369, filed Oct. 16, 1970, entitled, "Intermittent Drive Mechanism," now abandoned, the prior copending application being assigned to the same assignee as the present invention.

BACKGROUND OF THE INVENTION (1) Field of the invention

The present invention relates generally to apparatus for intermittently advancing a web of flexible film, and more specifically to drive means for imparting repeating cycles of intermittent motion and dwell to a web of flexible film, the drive means being operated in synchronism with a sealing apparatus which performs an operation on the web, such as, for example, the simultaneous welding and severing of a pair of superimposed webs so as to form a side-weld bag structure or the like.

(2) Description of the prior art

The apparatus of the present invention constitutes an improvement over those devices disclosed and claimed in U.S. Patents 2,947,345, G. T. Schjeldahl, "Machine for Making Articles from Multiple Thermoplastic Webs," dated Aug. 2, 1960; and No. 2,997,889, G. T. Schjeldahl, et al., "Intermittent Engine," dated Aug. 29, 1961, both of these patents being assigned to the same assignee as the present invention.

In each of these prior patents, apparatus is described for the handling of thermoplastic webs, particularly superimposed thermoplastic webs which are treated with a hot-knife performing a simultaneous severing and welding operation on the webs. Each of the devices described in these patents utilizes rack-and-pinion drives for the intermittent actuation of the draw rolls. The apparatus of the present invention also utilizes a rack-and-pinion mechanism, the arrangement being modified so as to extend the draw cycle beyond the 180° maximum previously available with a conventional rack-an-pinion drive.

Machine speed is normally limited by the draw cycle, since the durability of the film being treated will determine the maximum acceleration rate possible in the web. Inasmuch as the apparatus of the present invention provides an extended draw cycle, it is possible to increase the cycle rate of the apparatus without increasing the rate of acceleration of the draw mechanism, thus providing an increased rate of production over that which would be possible with apparatus equipped with conventional drive mechanisms.

In a second operational mode, it is possible to increase the rate of production by as much as one-third, without increasing machine speed. This is possible by coupling the individual input driver means at 180°, one to another, and thereafter de-coupling both drivers from the output shaft so as to impart a dwell cycle following sequential inter-coupling of both first and second driver means to the output shaft. Thus, extended or elongated structures may be prepared wherein the draw extends over 360° of driver motion, with the dwell portion of the cycle extending for an additional 180° following simultaneous de-coupling of both driver means. Thus, a complete operational cycle is achieved for each 270° of machine motion.

SUMMARY OF THE INVENTION

In accordance with the present invention, drive means are provided for imparting repeating cycles of intermittent motion and dwell to a web of flexible film, with the motion normally being imparted to the system with a pair of rack-and-pinion drives. The rack is coupled to an input shaft, with the teeth of the rack being in mesh with a pinion on an output shaft. The individual racks are preferably arranged on opposite ends of a draw roll, and are arranged in arcuately spaced phased relationship. For example, in one operational mode, the individual eccentric arms driving the racks may be displaced for 120° of arc, and if so, the first rack will preferably drive the output shaft for 150° of motion, with the second rack taking over at that point in the cycle. The second rack will, at that time, be advanced 30° from its individual starting point, and will continue driving the output shaft for an additional 150° of motion. At that point, the input shaft has rotated 300°, and the remaining 60° are available for the dwell cycle.

Therefore, it is the principal object of the present invention to provide an improved drive means for imparting repeating cycles of intermittent motion and dwell to a web of flexible film, the drive means utilizing rack-and-pinion structures and being capable of imparting motion to the web for more than 180° of machine operation.

It is yet a further object of the present invention to provide means for intermittently advancing a web of flexible film utilizing twin rack-and-pinion drives, the individual racks being disposed in spaced phased relationship one to another, so as to impart motion to the web over more than 180° of input shaft rotation.

It is still a further object of the present invention to provide an improved bag-making machine utilizing drive means for intermittently advancing superimposed webs of thermoplastic sheet film, the drive means utilizing twin rack-and-pinion drives, with the racks being coupled to a common input shaft and being disposed in spaced-apart phased relationship so as to achieve drive cycles in excess of 180° of rotation of the input shaft.

Other and further objects of the present invention will become apparent to those skilled in the art upon a study of the following specification, appended claims, and accompanying drawings.

BRIEF DESCRIPTION OF THE DRAWINGS

FIG. 2 is an end elevational view of the structure, and illustrating the arrangement and disposition of the twin rack drives, each of which is coupled to one end of the draw roll;

FIG. 3 is a plot of rotation of the input shaft versus draw rate for a typical operational cycle in one operational mode, and illustrating the active portion of the draw for the individual drivers in solid line, and illustrating idle portions for the individual driver mechanisms in dashed lines;

FIG. 5 is a partial vertical sectional view of the rack-and-pinion structure shown in FIG. 1, and illustrating this portion of the apparatus in greater detail, this view being taken generally along the line and in the direction of the arrows 5—5 of FIG. 1;

FIG. 6 is a view similar to FIG. 1, and additionally illustrating the details of the reciprocating hot-knife structure employed in a bag-machine utilizing the drive mechanism of the present invention;

FIG. 7 is a partial vertical sectional view taken through the center axis of the apparatus, and illustrating details of the draw roll and sealing sections of the apparatus; and FIG. 8 is a plot similar to that shown in FIG. 3, and illustrating a typical operational cycle in an alternate operational mode, with the draw portion of the cycle extending for 360° of machine rotation, and with the dwell cycle extending for a period of 180° of machine rotation.

DESCRIPTION OF THE PREFERRED EMBODIMENT

Figure 1:
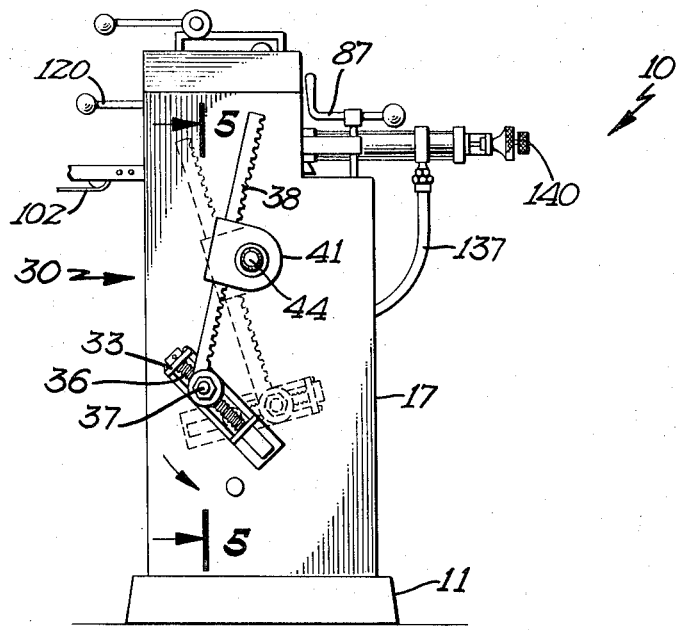
FIG. 1 is a side elevational view of the rack-and-pinion drive means employed in the present invention, and illustrating in solid lines, a rack-and-pinion assembly on the near side of the apparatus, and illustrating, in phantom, the rack structure on the opposite side of the structure.
Figure 4A:
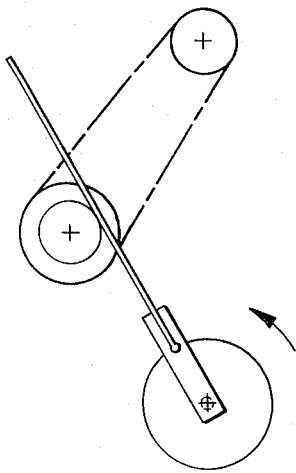
FIGS. 4A and 4B are schematic illustrations of the rack-and-pinion structures taken from opposite sides of the machine, and illustrating the spaced phase relationship existing between the individual rack structures, with FIG. 4A illustrating the rack on one side of the structure at the start of its draw cycle, and with FIG. 4B illustrating the disposition of the rack on the opposite side of the structure in the disposition where its draw cycle is initiated after 120° rotation of the driver shaft.
Figure 4B:
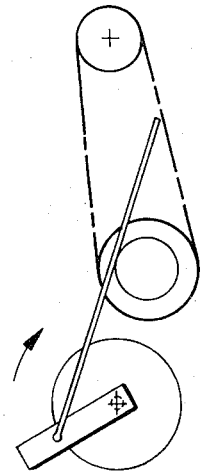

In accordance with the preferred modification of the present invention, the bag-making apparatus generally designated 10 is provided with a frame structure including a base 11, and upright frame mounting members 12, 13, 14, 15, 16 and 17. Details of a conventional bag-making machine utilizing a conventional drive are set forth in U.S. Pat. No. 2,947,345, as referred to hereinabove. A drive motor 20 is mounted on the base member 11 by conventional means, the shaft of motor 20 being coupled at 21 to drive shaft 22, shaft 22 being coupled to the input of a conventional clutch-brake assembly generally designated 23. Shaft 24 rotates with shaft 22 through clutch portion 25, or is idle when the clutch-brake assembly 23 is stopped against its brake portion 26. Drive gear 27 is fast upon shaft 24, and is in mesh with gear 28, which, in turn, is fast upon the end of input shaft 29. It will be observed that input shaft 29 extends across the entire width of the apparatus, and is appropriately journaled for rotation with suitable bearings in each of the upright post members 12–17 inclusive.

At opposite ends of the input shaft 29, there are disposed driver units such as the driver units generally designated 30 and 31, these being of the rack-and-pinion type. With particular attention being directed to FIGS. 1 and 2 of the drawings, a crank element is secured to each end of the shaft 29, such as the crank elements 33 and 34, each comprising a component part of drivers 30 and 31, respectively. Each of the cranks 33 and 34 is provided with a screw adjustment such as the screw adjustment column 36 for radially adjusting the respective crank pins, such as the pin 37 at a desired radial distance from the axis of shaft 29. A gear rack 38 is pivotally secured to pin 37 and a similar gear rack 39 is pivotally secured to pin 40 which is a portion of driver 31. At each side of the machine, a rack guide such as the rack guide 41 is provided, along with a pinion gear 42 (illustrated in detail in FIG. 5) which is alternately driven in one direction and then in the other during the rotation of input shaft 29 and its respective cranks.

Each of the pinions 42 is secured fast onto shafts such as the respective shafts 44 and 45, these shafts being provided with gearing 46 and 47 respectively. Gears 46 and 47 drive pinion 48 and 49 secured to shafts 50 and 51, respectively, shafts 50 and 51 being journaled in parallel relationship to shafts 44 and 45. Also secured to each of the shafts 50 and 51 are gears 52 and 53, respectively, which, in turn, drive gears 54 and 55 which are secured to sleeves 56 and 57, sleeve 56 being journaled across frame members 16 and 17, sleeve 57 being journaled across frame members 12 and 13. Sleeve 56 is secured to clutch-brake assembly 60, while sleeve 57 is coupled to clutch-brake assembly 61. As is apparent in the drawing, sleeve 56 is coupled to clutch member 62 in clutch-brake assembly 60, while sleeve 57 is secured to clutch member 63 in clutch-brake assembly 61. The core 64 in clutch-brake assembly 60 is secured to one end of the draw roll drive shaft 65 while core 66 of clutch-brake assembly 61 is secured to draw roll drive shaft 67 at the other side. Brake 68 in clutch-brake assembly 60, as well as brake 69 in clutch-brake assembly 61, are each adapted to hold the draw roll shaft stationary until either of the clutch members 62 or 63 is energized, whereupon the draw roll or output shaft 70 will rotate with either of the drivers 30 or 31.

The use of a pair of racks on opposite sides of the draw roll enhace the dynamic balance of the apparatus, however it will be appreciated, of course, that both driver mechanisms may be provided on only one side or the other of the structure. Also, in addition to rack and pinion devices, Geneva drives or stepping motors may be employed.

Draw roll 70, which is the output shaft of the structure, is suitably journaled in bearings within frame posts 14 and 15, and is is arranged in parallel relationship with a mating roll 71, disposed immediately thereabove. Roll 71 is, of course, journaled in axial parallel relationship or alignment with roll 70, and is preferably slidably mounted at each side of the apparatus in posts 14 and 15 respectively. Means are provided for permitting the upper roll 71 to be disposed in pressure engagement with the draw roll or output shaft 70.

It is preferable that a resilient sleeve surround each of the shafts 70 and 71, as shown in FIG. 7, such as the resilient sleeves 73 and 74. These resilient sleeves are preferably provided with a series of axially spaced circumferential slots such as the slotted area 75, each slot being adapted to retain a finger 76, as shown in FIG. 7. The fingers each preferably terminate in a forwardly bent portion and prevent web material from clinging to the drive rolls and becoming wrapped therearound.

Another axially aligned roll assembly 80 lies parallel to the roll sections 70 and 71 as shown in FIG. 7, and is also rotatably journaled for rotation on shaft 81 across frame elements 14 and 15 to permit independent rotation thereof. A further roll assembly 82 is journaled on shaft 83 which is on substantially the same plane as shaft 81, and is provided with means journaling the shaft for rotation within the frame members 14 and 15.

A synchronizing roll assembly 84 is also provided and arranged in axial alignment with the other roll assemblies. Shaft 84 is mounted for rotation within a pair of spaced blocks 85–85, these spaced blocks being threadedly mounted upon a vertical screw rod 86 which is mounted for rotation between spaced brackets at the upper portion of each of the frame posts 14 and 15. Handle element 87 is used to control the motion of the screw rod 86, and if desired, a worm drive arrangement as shown at 88 and 89 may be used to drivably inter-connect a pair of oppositely disposed screw rods 86. The details of this structure are discussed in U.S. Patent No. 2,947,345 referred to hereinabove.

Also in alignment with draw rolls 70 and 71 is a back-up paid roll 91 for cutting and sealing webs. Roll 91 is tough and resistant to heat, and is preferably provided with an exterior layer of polytetrafluoroethylene (Teflon). The upper surface of roll 91 is substantially on the horizontal plane with the nip of the rolls 70 and 71, with the web 92 being arranged to pass thereover. The cutting and sealing roll 91 has a central shaft 93 which is journaled in the frame elements 14 and 15, and preferably has an axial extension to which sprocket 93a is secured. Sprocket 93a is drivably inter-connected with sprocket 94 by means of roller chain 95. Thus, whenever draw roll 70 rotates, the cutting and sealing roll 91 will also rotate in the same direction. Since the roll 91 must rotate sufficiently fast to accommodate web travel, it is preferable to move the sealing roll at a somewhat more rapid peripheral rate of speed than the web speed so as to eliminate wrinkle or buckling of the web.

Forwardly of the cutting and sealing roll 91 is an endless delivery belt assembly 102 which is trained about roller means 103 to pick off severed and sealed articles from the roll 91 as shown in FIG. 7. A rocking frame 104 is pivotally mounted at 105 just above the upper stretch of belt 102 and carries a pick-off roller 106 normally biased out of contact with belt 102 but depressible at the end of cutting and sealing of an article so as to pull it away from the roll 91 and cause it to travel on belt 102. Frame 104 is biased upwardly by means of the spring 107 and is caused to lower the roller 106 whenever solenoid actuator 108 is energized. After reaching the end of belt 102, the individual articles may be disposed of in a manner common in the art, such as by stacking, or the like.

The details of actuation of solenoid 108 are described in U.S. Patent 2,947,345.

If desired, the web advancing may be controlled by an electric eye control system similar to that described in detail in U.S. Pat. 2,947,345, and also in other techniques well known in the art. In this event, however, the termination of coupling of driver 31 through clutch-brake assembly 61 will control the ultimate length of draw, with the initiation of the draw cycle being determined by driver 30.

CUTTING AND SEALING OPERATION

In order to properly cut and seal the web 92, a single straight hot knife blade 115 overlies the cutting and sealing roll 91 normally in spaced relation and is adapted to be depressed thereagainst when the web 92 has been advanced to their proper positions on roll 91. Hot knife 115 is heated to a constant temperature through electric leads 116 from a controlled source of energy, not shown. Hot knife 115 has a latticed frame mounting 117 so constructed as not to permit accumulation of heat or the development of unevenly heated areas along the length of the blade 115. The knife 115 is caused to slide vertically with respect to frame elements 14 and 15 and in guided relation therewith. The frame 117 is eccentrically mounted at a side of the machine to a pivot block 118, the pivot block 118, in turn, being secured to a shaft 119, as shown in FIG. 6. A handle 120 is secured forwardly on each of the pivot blocks 118 so that, when either handle 120 is raised, the knife 115 will be kept upwardly in spaced relation with the roll 91 at all times. The shaft 119 is rotatably mounted adjacent each end in arm 122, the latter being pivotally suspended at 123 from a link 124, in turn pivotally mounted at a fixed position 125 at corresponding sides of the frame elements 14 and 15. On each of the arms 122 between the pivot points 119 and 123 is pivotally secured at 126 a depending yoke 127 which, in turn, rides loosely upon an eccentric 128, as shown in FIG. 6. Eccentrics 128 are secured in the same relative position to a shaft 129 which extends across the frame elements 14 and 15 and operates simultaneously. A crank arm 130 is secured to shaft 129 so that, whenever the crank 130 is moved counter-clockwise for a short distance, the yoke 127 will be permitted to lower at each position and will permit the knife 115 to descend toward the roll 91. If the handles 120 are in lower position, the hot knife 115 will actually contact the roll 91 and press thereagainst with its own weight suspended thereon. Bearing pressure will then be removed from each of the yokes 127 and its corresponding eccentric 128. In practice, a small clearance such as one-sixteenth of an inch is sufficient to permit the knife blade 115 to rest its weight upon roll 91 without being forced downwardly thereagainst.

The crank 130 is actuated by a piston rod 131 which is pivotally connected thereto at 132. The piston rod 131, in turn, is connected to a piston 133 which is slidably received within the hydraulic cylinder 134. A compression spring 135 biases the piston 133 normally rearward so as to maintain the crank 130 rearward and the knife blade 115 in raised position. Cyclinder 134 is rigidly mounted to a bracket 136 which, in turn, is secured to frame elements 14 and 15. A hydraulic inlet tube 137 communicates with the rear end of the cylinder 134 for causing the piston to move forwardly against compression spring 135. Upon release of pressure, the spring 135 will cause the piston to return and force fluid outwardly through the tube 137. An adjustably abutment screw 138 is threadably mounted in the rear end 139 of the cylinder 134 and has a thumb nut 140 at the outer end thereof for adjusting the abutment stop 141, which, in turn, determines the rearmost position of piston 133 under biasing influence of compression spring 135. Another nut 142 has an annular groove 143 which is adapted to slidably receive a yoke 144 as shown in FIG. 6. The yoke 144 extends forwardly in bracketed sliding engagement with the cylinder 134 and has mounted thereon a switch 145 which is operated by an actuator 146 having a bifurcated forward end 147 and normally biased forwardly by compression spring 148. Crank arm 130 carries a pin 149 which is received in the bifurcated portion 147 of the switch actuator 146. When the arm 130 and piston 133 are biased rearwardly, the switch 145 will establish one circuit while, when moved forwardly under the pressure of hydraulic fluid in line 137, will establish another circuit, as will be described in detail under the operation of the machine.

ELECTRICAL CIRCUIT AND OPERATION

In order to establish a side-welding operation for the preparation of bags or other elongated structures from the web 92, the web is initially positioned on the roll system, with the folded web being advanced by the output shaft operating the draw rolls 70 and 71. The hot knife 115 will be maintained at a constant temperature suitable for cutting and welding the particular thermoplastic web in the desired thickness. The main drive motor 20 is constantly energized and rotates the input shaft 29 through gears 27 and 28 whenever clutch-brake assembly 23 is energized, it being understood that no rotation is imparted to input shaft 29 when clutch 25 is de-energized and brake 26 is energized. Cams 150, 151, 152 and 153 are all fixed to, and rotate with shaft 29 to establish the sequence of operation.

In a first or normal operational mode, an operational cycle of the apparatus includes one complete rotation of input shaft 29 beginning with the individual crank arms 33 and 34 in out-of-phase alignment, but with the crank arm 33 in upright position and in alignment with the gear rack 38. Thus, the position illustrated in FIG. 1 is subsequent to this point in the cycle, with the crank arms having progressed a short arcuate distance from the starting point. The individual crank arms are disposed 120° from each other, with the arm 33 leading the arm 34. With attention being directed to FIG. 3 of the drawings, it will be observed that the rate of motion of the web increases until a peak or top speed is reached at 90° of motion of the input shaft 29, and thereafter the rate decreases on a sinusoidal rate until 150° of motion has been achieved. At that point, clutch 62 is de-energized, and clutch 63 is energized so as to couple driver 31 to the output shaft 70 constituting the draw roll of the system. The driver 31 controls the motion for the portion of the cycle between 150° and 300° of rotation of the input shaft 29. The remaining 60° are utilized for dwell, during which the sealing operation will occur. With this arrangement, long bag structures, up to 30 inches or more in length, may be fabricated at rapid machine rates. The peak speed for a 30-inch bag compares to that for an 18-inch bag fabricated by machines utilizing conventional draw cycles extending for only 180° of rotation.

In this normal operational mode, cam wheel 150 controle the clutch-brake system 23, and cam wheel 153 controle the clitch-brake systems 60 and 61 which in turn drive the output shaft or draw roll 70. Cam wheel 151 initiates the cutting and sealing movement of hot knife 115 and a timing cycle which determines the dwell period thereof. Cam wheel 152 is utilized to control the operation of an electric eye in the system, when utilized.

The operation of the circuitry is set forth in detail in U.S. Patent 2,947,345, and reference is made to that disclosure for the details of operation of the present structure, it being understood that the arrangement is for a single web rather than a dual web as discussed in Patent 2,947,345.

It will be appreciated, also, that the operation of cam wheels 150 and 153 is closely coordinated and controlled in order that the sequential actuation occurs on a substantially simultaneous basis, thus eliminating any tendency for the film to be abruptly jerked in its draw cycle.

Typically, in the normal operational mode, the extent of overlap of the individual drive cycles for the drivers 30 and 31 will be equal to the length of the dwell. Since 60° dwell is typical, a 60° overlap is normally employed, thus providing for the 120° phase shift. It will be appreciated that the modest ripple which occurs or appears in the draw cycle is less severe for the web than the rigorous treatment previously afforded by conventional units utilizing 180° draws. The apparatus of the present invention has been found capable of producing bags 31 inches in length at a cycle rate of 120 cycles per minute. Also, in a typical operational cycle of this type, the dwell cycle includes 80° of timing, with 30° of the dwell time being devoted to the actual sealing operation. The remaining 50° of dwell are utilized with one-half being devoted to a lowering of the knife, and one-half being utilized for the raising of the knife. Longer knife dwell times may be utilized for some sealing operations, such as for periods of up to at least 54°. At a sealing rate of 50° of dwell and for 1½ mil polyethylene, a bar temperature of 800° F. is employed, while temperatures ranging from between 750° F. and 850° F. may be found satisfactory. The conveyor speed for the output is held or maintained at a rate of 400 feet per minute, with rates from 350 feet per minute to 400 feet per minute being typical.

It will be appreciated that the times and temperatures set forth hereinabove, are typical of certain operational modes. It is possible, therefore, to utilize lower temperatures with longer dwell times and satisfactory seals are still obtained. In one operation, it has been found that 1½ mil polyethylene may be sealed with a sealing bar having a temperature of 300° F., however the dwell time is 30° of a 90-cycle-per-minute rate. It will also be appreciated that side-weld and bottom seals may be prepared utilizing this mechanism.

The foregoing description has been directed toward a technique for increasing the draw time for a typical system, however it is also possible to utilize this system for increasing the dwell time as well. In order to increase the dwell time substantially, such as, for example, to approximately 270°, the individual drivers are spaced 90° apart. With reference to FIG. 3, the driver 30 is arranged to be 90° ahead of driver 31. In actual operation, driver 31 is initially energized, that is, it is energized while driver 30 is at the 90° position. Following 45° of cycle time, that is, when driver 30 is at 135° of its cycle, driver 31 is de-energized and driver 30 is energized. Braking action is applied to both cranks at 180° of cycle time for driver 30, and this braking action is continued until driver 30 again reaches 90° of its cycle, at which time driver 31 is again energized.

The extensive dwell time of this cycle is desirable in certain applications, and it has been found that this operational mode continues to take advantage of the lower rate of acceleration of web, and thus the web is more gently treated.

In a second operational mode, it is possible to dispose the individual drivers 30 and 31 at 180°, one from the other. In this operational mode, as is illustrated in FIG. 8 of the drawings for each advanced-dwell cycle, 540° of machine rotation is utilized. For the first 180° of operation the first driver means is coupled to the output shaft, at which point the first driver means is de-coupled and the second driver means is inter-coupled to the output shaft. The second driver means remains coupled to the output shaft for the second 180° of machine rotation, and as such, completes the draw cycle. The following 180° of machine rotation are occupied by the dwell portion of the cycle, rotation are occupied by the dwell portion of the cyce, during which time the welding bar may perform a simultaneous welding and severing operation on the stationary web. Following the dwell cycle, the second driver means is initially coupled to the output shaft for the next 180° of operation, whereupon simultaneous de-coupling of the second driver means and inter-coupling of the first driver means to the output shaft occurs. Therefore, for each operational cycle, the web advancing portion comprises sequential inter-coupling of both first and second driver means, this being followed by simultaneous de-coupling to impart a dwell portion to the cycle. The dwell portion is normally equivalent in extent to the period of the advance imparted by the first and second driver means.

Electrically, the operation is not significantly different from that described in connection with the normal operational mode of the apparatus. In this connection, however, it will be observed that each individual clutch 62 and 63 will be energized for two successive spaced periods of 180° each, with the spacing between the energization periods being equal to 180° of machine rotation. The knife 115 is operative only during the dwell portion of the cycle, with the actuating means for the knife being energized only during this dwell portion. This operational mode is accomplished by suitably modifying the rate of rotation of the individual cams operating the clutches 62 and 63, along with the cam controlling the actuation of knife 115.

1. Thermoplastic web treating apparatus comprising, in combination, drive means for intermittently advancing superimposed webs of thermoplastic sheet film material and for stopping said superimposed webs for a predetermined period of dwell, and hot knife means for thermally welding said superimposed webs together at predetermined spaced intervals therealong; said drive means comprising:
  (a) drive means for imparting repeating cycles of intermittent motion and dwell to said web with the motion normally being along a certain predetermined web direction, said drive means including output shaft means having first and second input driver means operatively coupled thereto;
  (b) input shaft means and means for drivably rotating said input shaft in one rotational direction;
  (c) output shaft means adapted to be operatively coupled to said web;
  (d) first and second drive means responsive to the rotation of said input shaft means and being operatively coupled to said output shaft for drivably rotating said output shaft in one rotational direction, each driver means being effective for the rotation of said output shaft only during one-half of each rotational cycle imparted to each of said driver means by said input shaft;
  (e) means intermittently inter-coupling said first driver means to said input and output shafts for initiating rotation of said output shaft and continuing said rotation for a predetermined period of less than one-half cycle of rotation of said input shaft and for de-coupling said first driver means at said first predetermined period;
  (f) means for intermittently inter-coupling said second driver means to said input and output shafts upon de-coupling of said first driver means for continuing rotation of said output shaft for a second predetermined period of less than one-half cycle of rotation of said input shaft and for de-coupling said second driver means at said second predetermined period; and said hot knife means comprising:
  (g) heated blade means disposed generally transversely of the web axis and normally spaced from said web axis during advance of the web, and means for reciprocably moving said blade relative to said web to bring said blade into contact with said superimposed webs for welding said webs together during said period of dwell.

What is claimed is:

2. The combination as defined in claim 1 being particularly characterized in that said hot knife means is adapted to move reciprocably toward and away from said superimposed webs, and into contact with said webs.

3. Thermoplastic web treating apparatus comprising, in combination, drive means for intermittently advancing superimposed webs of thermoplastic sheet film material and for stopping said superimposed webs for a predetermined period of dwell, and hot knife means for thermally welding said superimposed webs together at predetermined spaced intervals therealong; said drive means comprising:
  (a) drive means for imparting repeating cycles of intermitten motion and dwell to said web with the motion normally being along a certain predetermined web direction, said drive means including output shaft means having first and second input driver means operatively coupled thereto;
  (b) input shaft means and means for drivably rotating said input shaft in one rotational direction;
  (c) output shaft means adapted to be operatively coupled to said web;
  (d) first and second driver means responsive to the rotation of said input shaft means and being operatively coupled to said output shaft for drivably rotating said output shaft in one rotational direction, each driver means being effective for the rotation of said output shaft only during one-half of each rotational cycle imparted to each of said driver means by said input shaft;
  (e) means intermittently inter-coupling said first driver means to said input and output shafts for initiating rotation of said output shaft and continuing said rotation for a predetermined period not exceeding one-half cycle of rotation of said input shaft and for de-coupling said first driver means at said first predetermined period;
  (f) means for intermittently inter-coupling said second driver means t osaid input and output shafts substantially simultaneously upon de-coupling of said first driver means to said input and output shafts substanshaft for a second predetermined period not exceeding one-half cycle of rotation of said input shaft and for de-coupling said second driver means at said second predetermined period; and said hot knife means comprising:
  (g) heated blade means disposed generally transversely of the web axis and normally spaced from said web axis during advance of the web, and means for reciprocably moving said blade relative to said web to bring said blade into contact with said superimposed webs for welding said webs together during said period of dwell.

4. The combination as defined in claim 3 being particularly characterized in that said hot knife means is adapted to move reciprocably toward and away from said superimposed webs, and into contact with said webs.

References Cited

UNITED STATES PATENTS

| | | | |
|---|---|---|---|
| 2,947,345 | 8/1960 | Schjeldahl | 156—515 |
| 2,648,183 | 8/1953 | Dalton | 226—37 X |
| 2,997,889 | 8/1960 | Schjeldahl | 74—125.5 |
| 3.489,326 | 1/1970 | Singleton | 226—188 X |
| 3,079,056 | 2/1963 | Grornewagen | 226—188 X |

DOUGLAS J. DRUMMOND, Primary Examiner

U.S. Cl. X.R.

156—583; 226—122

UNITED STATES PATENT OFFICE
CERTIFICATE OF CORRECTION

Patent No. 3,776,804      Dated December 4, 1973

Inventor(s) Thomas J. Monahan and Richard C. Adams

It is certified that error appears in the above-identified patent and that said Letters Patent are hereby corrected as shown below:

Column 9, line 17, "drive" should read -- driver --.

Column 9, line 47, "What is claimed is:" should be transferred to Column 8, line 74.

Column 10, line 29, delete the phrase "to said input and output shafts substan-" and insert instead -- for continuing rotation of said output --.

Column 10, line 27, "t osaid" should read -- to said --.

Signed and sealed this 21st day of May 1974.

(SEAL)
Attest:

EDWARD M.FLETCHER,JR.      C. MARSHALL DANN
Attesting Officer      Commissioner of Patents